United States Patent [19]
Blasczyk

[11] Patent Number: 5,555,943
[45] Date of Patent: Sep. 17, 1996

[54] COMBINED LAWN AERATING AND WEED REMOVER APPARATUS AND METHOD OF USING SAME

[76] Inventor: David B. Blasczyk, 30595 Skyline Dr., Golden, Colo. 80403

[21] Appl. No.: 420,097

[22] Filed: Apr. 11, 1995

[51] Int. Cl.$^6$ .................................................. A01B 45/02
[52] U.S. Cl. ............................ 172/22; 172/370; 294/60
[58] Field of Search ............................ 172/21, 22, 370, 172/19; 294/60; 111/7.1

[56] References Cited

U.S. PATENT DOCUMENTS

| | | | |
|---|---|---|---|
| 442,918 | 10/1890 | Roe | 294/60 X |
| 855,902 | 6/1907 | Orr | 294/60 X |
| 862,773 | 8/1907 | Wahlund | 294/60 X |
| 933,227 | 9/1909 | Billau | 294/60 X |
| 1,141,659 | 6/1915 | Scott | 294/60 X |
| 1,202,568 | 10/1916 | Nicosia | 172/370 |
| 1,482,745 | 2/1924 | Heid | 294/60 X |
| 1,965,177 | 7/1934 | Finkl | 111/7.1 |
| 2,030,770 | 2/1936 | Smith | 172/22 |
| 2,057,142 | 10/1936 | Fry | 172/22 |
| 2,210,440 | 8/1940 | Avary . | |
| 2,247,958 | 7/1941 | Maxcy | 294/60 X |
| 2,506,371 | 5/1950 | Lint | 172/19 |
| 2,708,593 | 5/1955 | Benoist | 172/22 X |
| 2,779,262 | 1/1957 | Furr et al. . | |
| 2,910,127 | 10/1959 | Saunders . | |
| 2,928,655 | 3/1960 | Armstrong . | |
| 3,011,563 | 12/1961 | Ceretti et al. | 172/22 |
| 3,123,391 | 3/1964 | Novak | 172/22 |
| 3,210,112 | 10/1965 | Glynn | 172/22 |
| 3,219,378 | 11/1965 | Padoshek . | |
| 3,756,323 | 9/1973 | Mays | 172/22 X |
| 3,865,055 | 2/1975 | Gilbaugh | 172/22 X |
| 4,135,752 | 1/1979 | Long . | |
| 4,490,911 | 1/1985 | Schultz . | |
| 4,856,599 | 8/1989 | Stammen . | |
| 5,042,778 | 8/1991 | Szazy . | |

FOREIGN PATENT DOCUMENTS 856537  12/1960  United Kingdom ..................... 172/22

*Primary Examiner*—Randolph A. Reese
*Assistant Examiner*—Victor Batson
*Attorney, Agent, or Firm*—Donald W. Margolis; Emery L. Tracy

[57] ABSTRACT

The present invention is a lawn-aerating and weed-pulling apparatus for use in aerating the ground and removing weeds. The apparatus comprises a substantially horizontal foot plate having a first side and a second side. A coring mechanism and a resilient biasing mechanism is secured to the second side of the foot plate. When the resilient biasing mechanism is compressed and then released it urges the foot plate and the coring mechanism which is secured to it in a generally upward direction. Upon exertion of a generally downward force on the foot plate, the resilient biasing mechanism is compressed, allowing the coring mechanism to penetrate the ground. Upon release of the generally downward force on the foot plate, the resilient biasing mechanism urges the foot plate and the coring mechanism which is secured to it upward, away from the ground, thereby removing a core of ground with substantially reduced or diminished effort on the part of the user.

13 Claims, 2 Drawing Sheets

COMBINED LAWN AERATING AND WEED REMOVER APPARATUS AND METHOD OF USING SAME

BACKGROUND OF THE INVENTION

1. Field of the Invention

The present invention relates to a combined lawn aerator and weed remover apparatus. More particularly, it relates to ground core removers which have utility to serve as lawn aerators, and which are also adapted to remove at least portion of a weed and weed root which is in the ground, as well as the ground surrounding a weed root.

2. Discussion of the Prior Art

Many types of lawn aerators for aerating lawns are known in the prior art. Weed removers for use in removal of undesirable weeds and plant are also known in the prior art. However, such lawn aerator and weed remover apparatus, have heretofore been cumbersome and labor intensive to use. In the prior art, Furr, et al. U.S. Pat. No. 2,779,262; Armstrong U.S. Pat. No. 2,928,655; Schutz U.S. Pat. No. 4,490,911; and Szazy U.S. Pat. No. 5,042,778 disclose various weed puller and plant cultivating apparatus, each of which is securable to a shoe of an individual, and each of which carries a forward tool or blade which enables engagement of a stalk of a weed for removal of the weed or for cutting the weed at ground level. Use of such weed pullers or tool requires the user to kick or otherwise propel his or her foot into the ground to grab or cut the stalk of the weed. When a weed is grabbed by such a puller the user is required to rock or pivot and exert considerable effort to withdraw the weed from the ground. It will be understood that these apparatus are not effective to remove deep rooted weeds or the roots of weeds, that it provides no aeration to the ground, and that they have the potential to cause injury to the foot, leg or back of the user.

Padoshek U.S. Pat. No. 3,219,378 discloses a hand held lawn perforator and weeder that is held and stabilized by a user in a standing position, and which is driven into the ground by applying the pressure of one foot to the top of the perforator. When perforation is completed the user must then use his or her legs, back and arms, and exert considerable effort to pull the perforator from the ground. Long U.S. Pat. No. 4,135,752 discloses an open cylindrical device which includes a bail handle which is pivotally attached to the top of the cylinder. It is used to remove a plug of dirt from the ground by placing the open bottom of the cylinder on the ground with the bail pivoted downwards to expose the top of the cylinder. This allows the top of the cylinder to be stepped on by the foot of the user to press it into the ground. Then, the bail handle is pivotally raised to allow the user to grasp it as a handle in order to remove the cylinder and a plug of dirt from the ground by using the power of the hand, arm, shoulder, back and legs of the user.

None of the known prior art aerator or weeder tools allow a user to remove a core from the ground, or to remove at least portion of a weed and the weed root from the ground without requiring the user to use substantial pulling force to remove the core or the weed from the ground.

SUMMARY OF THE INVENTION

It is therefore an object of the present invention to provide a lawn-aerating and weed-removing tool which can remove at least a core from ground, and which is also adapted to remove at least a portion of a weed and weed root from the ground, and which tool substantially diminishes or eliminates the pulling force which the user must expend in order to remove the core or the weed from the ground.

The present invention is a ground-aerating and weed-pulling apparatus for removing at least a core of the ground, and which is also adapted to remove at least portion of a weed and the root of the weed which is in the ground, and some of the ground which surrounds the root of the weed.

The apparatus of the present invention includes a foot plate having a foot side and a ground side, with at least one coring mechanism secured to the ground side. The coring mechanism is adapted for use in removing at least a core of the ground for aerating the ground, and, when appropriately placed, to remove at least a portion of a weed and the root of the weed which is in the ground, as well as the ground surrounding the weed. In addition to the coring mechanism, a resilient biasing mechanism is also secured to the ground side of the foot plate. In the preferred embodiment of the present invention, there is provided a mechanism for releasably securing the foot plate to the foot of a user. This allows the user to attach the ground aerating and weed pulling apparatus to his or her foot and to step along the ground. Then, by exerting a generally downward force on the foot to which the foot plate, coring mechanism and resilient biasing mechanism is secured, the coring mechanism is driven downward into the ground, and the resilient biasing mechanism is compressed between the foot plate and the ground. As a result the apparatus aerates the ground, and when the opportunity presents itself, the user may selectively place the coring mechanism around the head of a weed for use in removing at least portion of such a weed, including at least portion of the root, and the ground surrounding the weed and its root. The downward force which is required to drive the coring mechanism downward into the ground, and to also compress the resilient biasing mechanism, is generally little more than the normal weight and stepping force of the user. After the coring mechanism is driven downward into the ground, the user then removes his or her body weight and exertion from the foot plate. When the weight and exertion are removed from the foot plate, the energy of the compressed resilient biasing mechanism serves to urge the foot plate and the attached coring mechanism in a generally upward direction out of the ground, thereby removing a core of ground. As a result, the amount of effort which the user must expend in order to remove the coring mechanism and core from the ground is either eliminated, or substantially diminished.

The coring mechanism includes at least one hollow core blade, the hollow core blade including a sidewall. In preferred embodiments the sidewall defines an aperture through the sidewall through which cored material within the blade can be discharged. Such cored material is discharged either upon removal of the blade from the ground, or by the pressure of subsequent core material which enters the core blade. The hollow core blade is normally vertical to the foot plate for maximum entrapment of the root of a weed, although the hollow core blade can also be offset at an angle 2 to the vertical axis.

In another embodiment of the present invention, the apparatus is not worn on the foot, but rather includes a handle mechanism which is attached to the foot side of the foot plate. The handle mechanism includes a rod which extends upward from the first side of the foot plate and a grip which is attached to the upper portion of the rod. The handle mechanism allows the combined foot plate, coring mechanism and resilient biasing mechanism to be carried by a person from location to location for selective placement, say only over weeds. Then, by exerting a generally downward force on the foot plate with one foot, the coring mechanism is driven downward into the ground, and the resilient biasing mechanism is compressed between the foot plate and the ground. Then, as with the foot mounted device, after the coring mechanism is driven downward into the ground by foot pressure, the user then removes their foot and body weight from the foot plate, after which the energy of the resilient biasing mechanism serves to urge the foot plate and the coring mechanism in a generally upward direction out of the ground, thereby removing a core of ground or a weed and the surrounding ground. As with the foot mounted device, the amount of effort which the user most exert in order to remove the handle mounted coring mechanism and core from the ground is either eliminated, or substantially diminished.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DETAILED DESCRIPTION OF THE PREFERRED EMBODIMENTS

Figure 1:
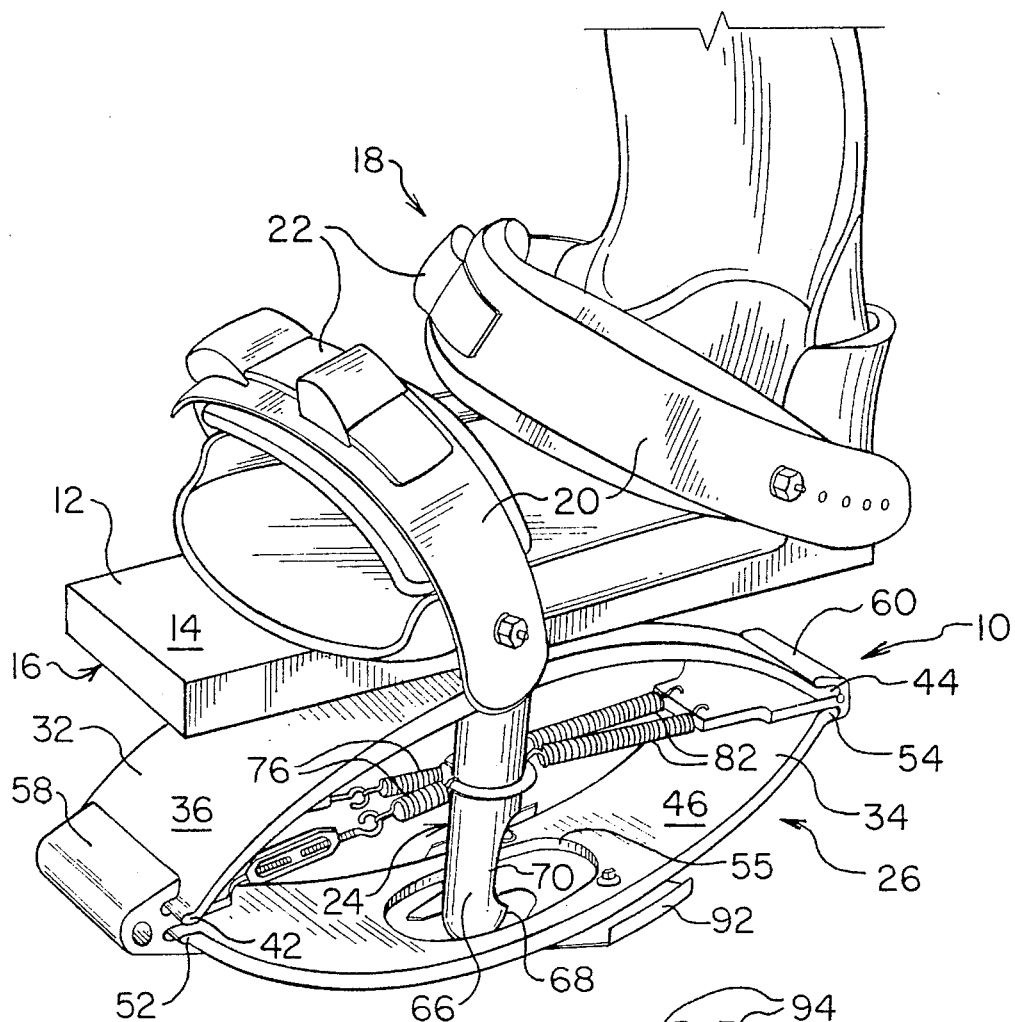
FIG. 1 is a top front perspective view of a lawn-aerating and weed-pulling apparatus constructed according to the present invention, and which is adapted to be worn on the foot of a user.
Figure 2:
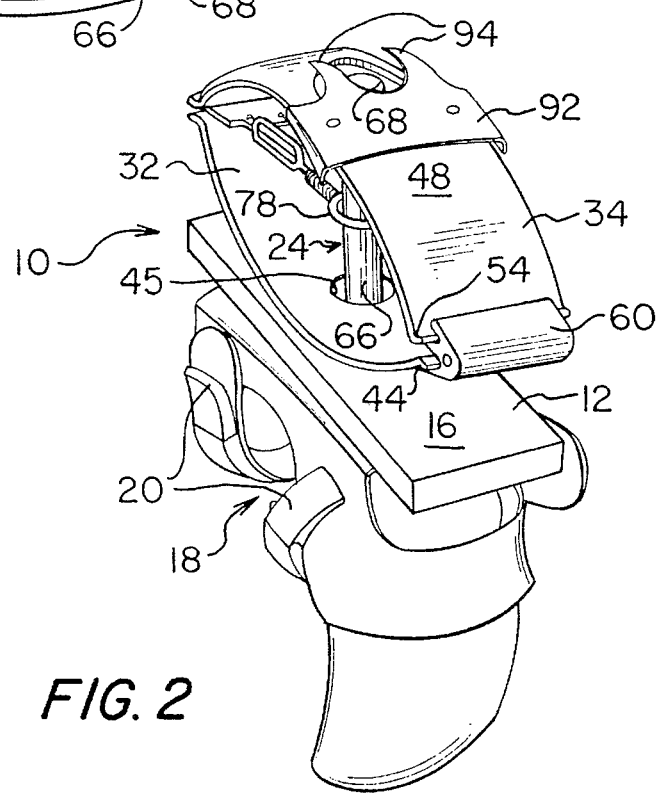
FIG. 2 is a bottom rear perspective view of the apparatus of FIG. 1.

As illustrated in FIGS. 1 and 2, the present invention is a combined lawn-aerating and weed-pulling apparatus, indicated generally at 10. The apparatus includes a foot plate 12 having a first or foot side 14 and second or a ground side 16. Foot plate 12 can be constructed of any known material which is typically lightweight yet strong enough to support the weight of a person. Materials which can be used in the construction of the foot plate 12 include, but are not limited to, wood, plastic, metal and ceramic. In this embodiment, a releasable foot-receiving binding, generally 18, is attached to the first or foot side 14 of the foot plate 12. The foot-receiving binding 18, as shown, includes a plurality of straps 20 and buckles 22 for releasably securing a foot of a user, not shown, therein. Of course, other known art and equivalent binding mechanisms can be used to secure the combined lawn-aerating and weed-pulling apparatus of the present invention to a foot of a user.

At least one coring mechanism, generally 24, is secured to the second or ground side 16 of the foot plate 12. The coring mechanism 24 is adapted for use in removing at least a core of the ground for use in aerating the ground, and which coring mechanism 24 is also adapted to remove at least a portion of a weed which is in the ground, not shown, including at least portion of the root, and the ground surrounding the weed and its root. A resilient biasing mechanism, generally 26 is also provided secured to the second or ground side 16 of the foot plate 12, and is described in greater detail below. In the preferred embodiment of the present invention, the foot plate 12 is releasably secured to at least one foot of a user, not shown, by releasable foot-receiving binding 18. This allows the user to step along the ground, and by exerting a generally downward force on the foot to which the foot plate and coring mechanism is secured, drives the coring mechanism 24 downward into the ground for use in aerating the ground. At the same time the resilient biasing mechanism 26 is compressed between the foot plate 12 and the ground. As the opportunity presents itself, the user may selectively place the coring mechanism 24 around the head of a weed for use in removing at least portion of such a weed, including at least portion of the root, and the ground surrounding the weed and its root. The downward force which is required to drive the coring mechanism 24 downward into the ground, and to also compress the resilient biasing mechanism 26, is generally little more than the normal weight and stepping force of a user wearing the combined lawn-aerating and weed-pulling apparatus of the present invention. After the coring mechanism 24 is driven downward into the ground, the user then removes body weight and exertion from the foot plate 12. As a result, the resilient biasing mechanism 26 serves to urge the foot plate 12 away from the ground, and the coring mechanism 24 in a generally upward direction out of the ground, thereby removing a core of ground, and or a weed from the ground. As a consequence, the amount of effort which the user must use in order to remove the coring mechanism 24 and core from the ground is either eliminated, or at least substantially diminished.

In preferred embodiments the resilient biasing mechanism 26 includes a spring mechanism. More specifically, in the preferred embodiment shown the spring mechanism includes a first and second curved, flexible leaf spring member 32 and 34, respectively. The first curved, flexible leaf spring member 32 has a first surface 36 which is convex and a second surface 38 which is concave, and opposed first and second ends 42 and 44, and at least one opening 45 extending through its body. The second curved, flexible leaf spring member 34 has a first surface 46 which is concave and a second surface 48 which is convex, and opposed first and second ends 52 and 54, and at least one opening 55 extending through its body. The first and second curved, flexible leaf spring members 32 and 34 are joined to one another at their respective first ends 42 and 52 by a first connecting member 58, and at their respective second ends 44 and 54 by a second connecting member 60. As shown, first and second curved, flexible leaf spring members 32 and 34 are joined with their respective concave surfaces 38 and 46 facing one another, and with their respective openings 45 and 55 in alignment with one another. The first convex surface 36 of the first flexible leaf spring member 32 is secured adjacent to the second or ground side 16 of foot plate 12 by art known means, such as screws, not shown. When the opposed concave curvatures 38 and 46 of the first and second flexible leaf spring members 32 and 34 are collapsed by stepping downward on foot plate 12, spring members 32 and 34 have energy stored in them to provide a source of potential energy outward from the center point of the spring members 32 and 34. When weight is removed from foot plate 12, this potential energy causes spring members 32 and 34 to resume their original curvature, and to thereby be urged apart. As a result, spring members 32 and 34 of resilient biasing mechanism 26 serve to urge the foot plate 12 away from the ground, and the coring mechanism 24 in a generally upward direction out of the ground, thereby removing a core of ground, and or a weed from the ground.

First and second flexible leaf spring members 32 and 34, of the type shown, may be constructed from an exercise device sold under the trademark EXERLOPERS. The flexible leaf spring members 32 and 34 which are available as EXERLOPERS, are approximately twelve inches in length and three inches in width, and are normally separated from one another by about four inches at their center points. EXERLOPERS do not include openings 45 and 55. In a preferred embodiment of the apparatus 10 of the present invention, second flexible leaf spring member 34 is constructed of transparent material, such as clear plastic. The use of transparent material allows the wearer of apparatus 10 of the present invention to view the weed or ground below the apparatus prior to placing the coring mechanism 24 on the ground and applying body weight to foot plate 12. It should also be understood that other equivalent forms of resilient biasing mechanism, such as coil springs, not shown, may be used in the practice of the present invention.

Coring mechanism 24 may be secured to the second or ground side 16 of the foot plate 12 by a rigid sleeve 64 which is attached to the ground side 16 of the foot plate 12. Coring mechanism 24 extends through at least the opening 45 of flexible leaf spring member 32, and further extends through or is aligned with the opening 55 of the second flexible leaf spring member 34. The coring mechanism 24 includes a substantially cylindrical hollow core blade 66 having a sharpened portion 68 at the end thereof which will engage the ground. As shown in this preferred embodiment of the present invention, core blade 66 includes a sidewall which defines an aperture 70 through which cored material within the hollow core blade 66 can be easily discharged. Such cored material is discharged either upon removal of the core blade 66 from the ground, or in response to the pressure of subsequent core material which enters the core blade 66. Coring blade 66 can be centered directly under the center of the foot of the user, or it can be offset from the center depending on the needs or the desires of the user.

Figure 4:
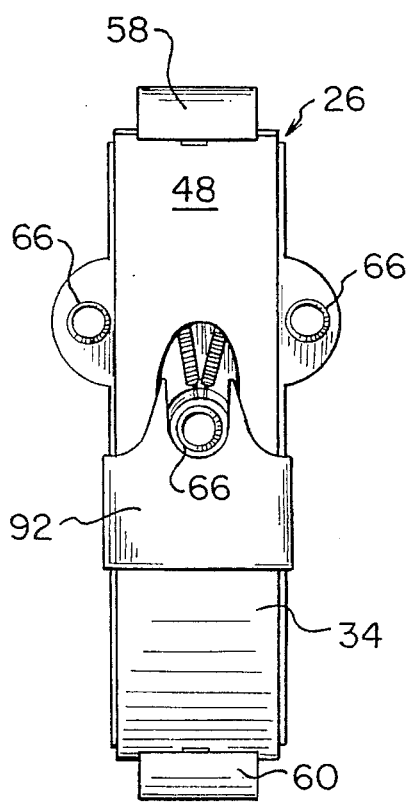
FIG. 4 is a bottom rear perspective view of a weed-pulling and lawn-aerating apparatus, similar to FIGS. 1–3, but showing another embodiment of the present invention in which a plurality of spaced apart coring blades are carried by a single foot plate.

In an alternative embodiment of the present invention, as shown in a bottom rear perspective view in FIG. 4, a plurality of spaced apart coring blades 66 can be carried by a single foot plate 12 apparatus. More than two coring blades 66 can be carried by a single foot plate 12, and the location of coring blades 66 is not limited to those which are shown.

In preferred embodiments, a coil spring mechanism 72 extends between, and is connected to first connecting member 58 and a second connecting member 60. The coil spring mechanism 72 serves to bias the first connecting member 58 toward the second connecting member 60, and vice versa, thereby biasing concave surfaces 38 and 46 of leaf springs 32 and 34 away from one another. Coil spring mechanism 72 includes a tensioning mechanism for adjusting the tension of the coil spring mechanism 72 according to the weight of the user of the apparatus 10. As shown in detail in FIG. 3, the tensioning mechanism includes a pair of toe springs 76 attached between an adjustable tensioning device 84 and annular member 78, and a pair of heel springs 82 attached between the annular member 78 and second connecting member 60. The tensioning device 84 is attached to the first connecting member 58 and includes a screw threadably received within an adjustable eye bolt, of the off the shelf "come along" type. Adjustment of the tensioning mechanism 84 is accomplished by rotating the eye bolt about the screw to tension or loosen the toe springs 76.

In order to have good traction while wearing and using the apparatus of the present invention to aerate or to remove weeds, a non-skid plate 92 can be attached to the bottom convex surface 48 of second leaf spring member 34. Attached to the nonskid plate 92 are tines 94 which serve to protect the blade 66 when the apparatus 10 is not in use.

Figure 3:
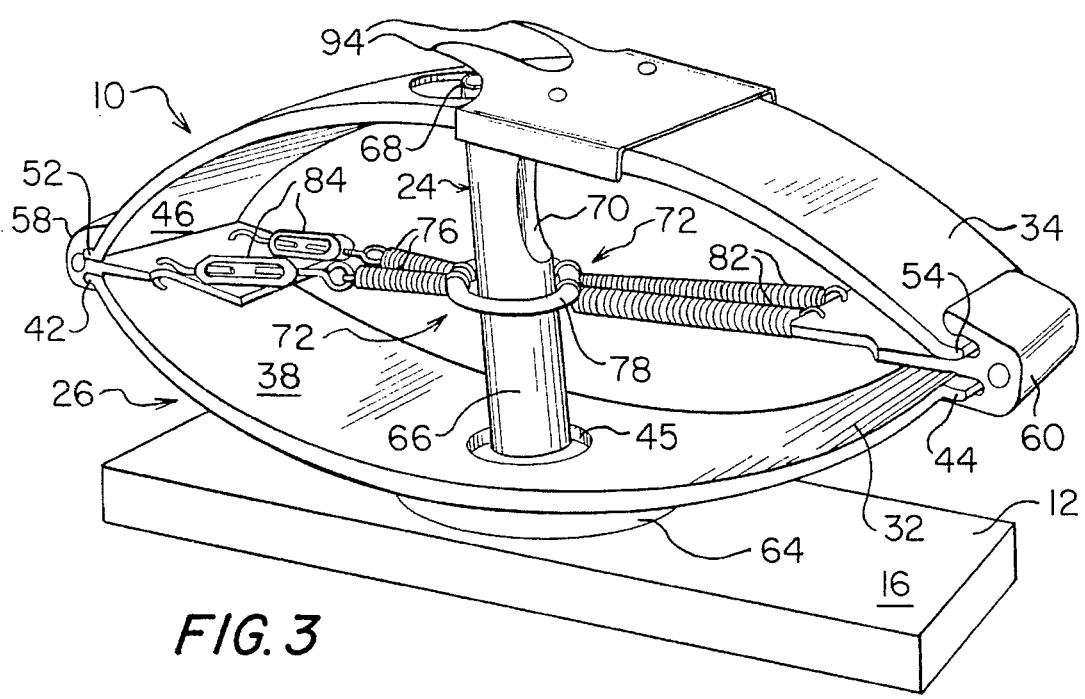
FIG. 3 is an enlarged bottom perspective view of the mechanism, for adjusting the tension of the apparatus of FIGS. 1 and 2.

To aerate the ground or to remove weeds using the apparatus 10 of FIGS. 1–3, a user first inserts his or her foot into the foot shell 18 and releasably secures the shell 18 to the foot using the straps 20 and buckles 22. Then, the user approximately centers the coring blade or blades 66 over the portion of ground or weed which is intended to be aerated or removed. The user then exerts a downward force on the foot plate 12 thereby substantially straightening the first and second curved, flexible leaf spring members 32 and 34, and driving the coring blade 66 into the ground. Upon release of the downward force, first and second curved, flexible leaf spring members 32 and 34 return to their normal curved shapes, thereby pushing foot plate 12 away from the ground. As a result, foot plate 12 pulls the coring blade 66 from the ground, along with the cored ground and at least a portion of any weed and weed root which was located below the coring blade 66. The user then repeats the process at the next portion of ground which is to be aerated or weed which is to be removed.

Figure 5:
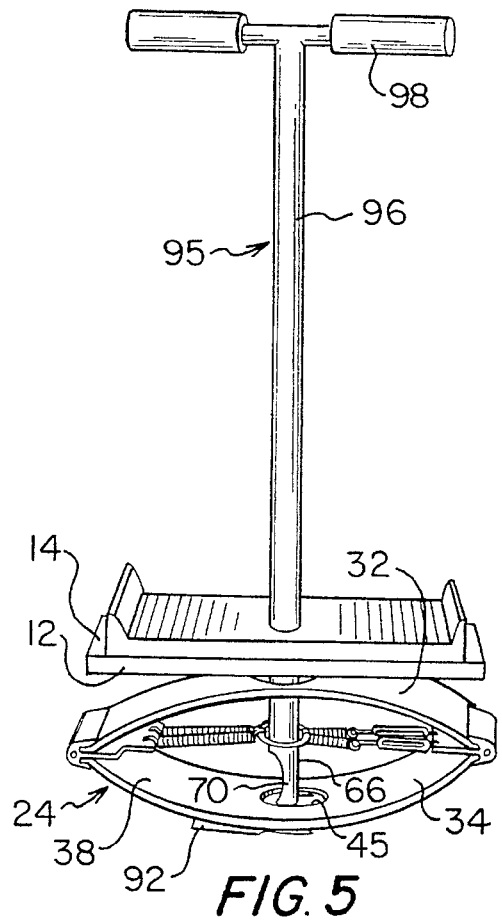
FIG. 5 is a top front perspective view showing yet another embodiment of the present invention in which the lawn-aerating and weed-pulling apparatus is adapted to be carried by a handle.

While the apparatus 10 of the present invention has been describe heretofore as being releasably securable to the foot of a user, the present invention can also be easily adapted for hand-held use. As shown in FIG. 5, in which like numbers represent like parts. In this embodiment of the present invention, the apparatus 10 is not worn on the foot, but rather includes a handle mechanism, generally 95, which is attached to the foot plate 12, thereby allowing the mechanism to be easily carried. The handle mechanism 95 includes a rod 96 which extends upward from the first side 14 of foot plate 12 and a grip 98 attached to the upper portion of the rod 96. The handle mechanism 95 of this embodiment allows the combined foot plate 12, coring mechanism 24, and resilient biasing mechanism 26 to be carried by a user from location to location for selective placement, say only over weeds. Then, while holding handle 95 substantially upright, by exerting a generally downward force on the foot plate 12 with one foot, coring mechanism 24 is driven downward into the ground, and the resilient biasing mechanism 26 is compressed between the foot plate 12 and the ground. Then, as with the foot mounted device, after the coring mechanism 24 is driven downward into the ground by foot pressure, the user then removes their foot and body weight from the foot plate 12, after which the energy of the resilient biasing mechanism 26 serves to urge the foot plate 12, and the coring mechanism 24 which is secured to it, in a generally upward direction out of the ground, thereby removing a core of ground or a weed and the surrounding ground. As with the foot mounted device, the amount of effort which the user must exert in order to remove the handle mounted coring mechanism and core from the ground is either eliminated or substantially diminished as a result of the stored energy which is released by the resilient biasing mechanism 26.

It is therefore seen that present invention provides a lawn-aerating and weed-removing tool which removes at least a core from ground, and which is also adapted to remove at least a portion of a weed and weed root from the ground, and which tool substantially diminishes or eliminates the pulling force which the user must expend in order to remove the core or the weed from the ground.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention. It should be further understood and that the scope of the present invention is to be limited only to the claims except as precluded by the prior art. Moreover, the invention as disclosed herein, may be suitably practiced in the absence of the specific elements which are disclosed herein.

What I claim is:

1. A lawn-aerating and weed-pulling apparatus for use by a user in removing weeds and aerating ground, the apparatus comprising: a foot plate having a first side and a second side, said second side including a portion which is designed and adapted to be centered substantially directly under the center of the foot of a user;

means for releasably securing said foot plate to at least one foot of a user, said securing means being attached to said first side of said foot plate;

resilient biasing means secured to said second side of said foot plate; and coring means for removing a plug of ground secured to said second side of said foot plate; whereby when said coring means is placed upon the ground, then upon exertion of a generally downward force on said foot plate, said resilient biasing means is compressed, thereby allowing said coring means to penetrate the ground, and whereby further, upon release of the generally downward force on said foot plate, said resilient biasing means urges said foot plate and said coring means away from the ground.

2. The apparatus of claim 1 wherein said resilient biasing means is a spring mechanism.

3. The apparatus of claim 2 wherein said spring mechanism includes a first and a second flexible curved leaf spring member, each said curved leaf spring member having a concave surface and a first end and an opposed second, each respective first end and second end joined to the respective first end and second end of the other curved leaf spring member, and with their respective said concave surfaces facing one another.

4. The apparatus of claim 3 and further including a third spring mechanism extending between said first ends and said second ends of said first and said second flexible curved leaf spring members, said third spring mechanism adapted to bias said first ends and said second ends of said first and said second flexible curved leaf spring members towards one another and said concave surfaces away from each other.

5. The apparatus of claim 4 wherein said third spring mechanism includes means for adjusting the tension of said third spring means.

6. The apparatus of claim 1 wherein said foot plate is adapted to receive the sole of a foot.

7. The apparatus of claim 1 wherein said coring means includes at least one hollow coring blade.

8. The apparatus of claim 7 wherein said hollow coring blade has a sidewall, and said sidewall defines an aperture for allowing any cored material within said hollow coring blade to be discharged from said hollow coring blade.

9. The apparatus of claim 8 wherein said foot plate is releasably securable to at least one foot of a user.

10. A method for aerating the ground and for selectively removing weeds with the apparatus of claim 9 comprising the steps of releasably securing said foot plate to a foot of a person; then applying force upon said foot plate in a generally downward direction toward the ground thereby causing said coring blade to penetrate the ground; and then releasing the force upon said foot plate; whereby said resilient biasing means urges said foot plate and said coring blade away from the ground.

11. The apparatus of claim 8 wherein said hollow core blade is offset from a centered portion of said second side of said foot plate.

12. The apparatus of claim 1 wherein said coring means includes at least two hollow coring blades.

13. The apparatus of claim 12 wherein said hollow coring blades have a sidewall, and said sidewall defines an aperture for allowing any cored material within said hollow coring blades to be discharged from said hollow coring blade.

\* \* \* \* \*